(12) United States Patent
Coppola et al.

(10) Patent No.: US 10,281,051 B2
(45) Date of Patent: May 7, 2019

(54) VEHICLE TANK PRESSURIZATION DEVICE

(71) Applicant: FCA Italy S.p.A., Turin (IT)

(72) Inventors: Michele Coppola, Turin (IT); Luigi Spada, Turin (IT); Marco Riaudo, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/463,171

(22) Filed: Mar. 20, 2017

(65) Prior Publication Data

US 2017/0299076 A1    Oct. 19, 2017

(30) Foreign Application Priority Data

Mar. 18, 2016  (EP) ..................................... 16161287

(51) Int. Cl.
*F16K 17/12* (2006.01)
*F16K 24/04* (2006.01)
(Continued)

(52) U.S. Cl.
CPC ............ *F16K 17/12* (2013.01); *F01N 3/2066* (2013.01); *F02M 37/0076* (2013.01);
(Continued)

(58) Field of Classification Search
CPC ........... B60K 2015/03026; B60K 2015/03256; B60K 2015/03269; B60K 2015/03296;
(Continued)

(56) References Cited

U.S. PATENT DOCUMENTS

| | | | | |
|---|---|---|---|---|
| 675,622 | A | * | 6/1901 | Clinton .................. F16K 15/06 137/533 |
| 2,308,829 | A | * | 1/1943 | Rieser ................. H01M 2/1205 137/533.19 |
| 2,532,282 | A | * | 12/1950 | Benson ................. A61M 15/08 128/203.22 |
| 2,633,113 | A | * | 3/1953 | McCarty ................ F01M 13/02 123/574 |

(Continued)

FOREIGN PATENT DOCUMENTS

DE    102010018962 A1    10/2011
DE    102011108380 A1    1/2013
(Continued)

OTHER PUBLICATIONS

Ruina, Andy, and Rudra Pratap. "Center of Mass and Gravity." Introduction to Statics and Dynamics, Oxford University Press, 2002, pp. 78-91. Retrieved from Internet Archive Wayback Machine <https://web.archive.org/web/20050219232223/http://ruina.tam.cornell.edu/Book/COMRuinaPratap.pdf> on Jan. 3, 2018.*

(Continued)

*Primary Examiner* — Mary E McManmon
*Assistant Examiner* — Richard K. Durden
(74) *Attorney, Agent, or Firm* — Greer, Burns & Crain, Ltd.

(57) ABSTRACT

A vehicle tank pressurization device has a valve seat establishing an opening for fuel vapors and/or air; such opening has a vertical axis coincident with the direction of application of an opening force, that is directed upwards and is produced, in use, by the pressure in an internal upper region of the tank; the device also has a movable shutter, placed on the valve seat, to open/close the valve seat, and having a weight set by design in such a way as to define the magnitude of a closing force directed downwards and with a center of gravity positioned eccentrically with respect to the vertical axis of the opening.

5 Claims, 3 Drawing Sheets

(51) Int. Cl.
*B60K 15/035* (2006.01)
*F01N 3/20* (2006.01)
*F02M 37/00* (2006.01)
*B60K 15/03* (2006.01)

(52) U.S. Cl.
CPC .... *F16K 24/04* (2013.01); *B60K 2015/03026* (2013.01); *B60K 2015/0358* (2013.01); *B60K 2015/03256* (2013.01); *B60K 2015/03296* (2013.01); *B60K 2015/03585* (2013.01); *F01N 2610/1413* (2013.01); *Y10T 137/7909* (2015.04)

(58) Field of Classification Search
CPC ......... B60K 15/03519; Y10T 137/7837; Y10T 137/7891; Y10T 137/7894; Y10T 137/7903; Y10T 137/7909; Y10T 137/7913; Y10T 137/7914; Y10T 137/7921; Y10T 137/79; Y10T 137/7901; Y10T 137/7908
USPC .. 137/512, 527.8, 533, 533.17, 533.19, 534, 137/855, 858
See application file for complete search history.

(56) References Cited

U.S. PATENT DOCUMENTS

| | | | | |
|---|---|---|---|---|
| 3,019,003 | A | * | 1/1962 | Glitsch ................. B01D 3/163 137/513.5 |
| 5,992,442 | A | * | 11/1999 | Urquhart .............. B65D 77/225 137/246 |
| 6,457,952 | B1 | * | 10/2002 | Haller ................... F04C 29/126 137/533.27 |
| 2005/0022869 | A1 | * | 2/2005 | Beyer .................... F16K 24/04 137/202 |
| 2005/0053505 | A1 | * | 3/2005 | Ichikawa ............ F04B 27/1009 417/559 |
| 2007/0204918 | A1 | | 9/2007 | Weaver et al. |
| 2012/0103983 | A1 | * | 5/2012 | Weaver ................ B65D 77/225 220/89.1 |

FOREIGN PATENT DOCUMENTS

GB 589068 A 6/1947
WO WO2007105020 A1 9/2007

OTHER PUBLICATIONS

EP16161287.4: Search Report dated Aug. 29, 2016 (8 Pages).

* cited by examiner

VEHICLE TANK PRESSURIZATION DEVICE

RELATED APPLICATIONS

This application claims priority from European Patent Application No. 16161287.4 filed on Mar. 18, 2016, the disclosure of which is incorporated herein by reference in its entirety.

FIELD OF THE DISCLOSURE

The present invention relates to a vehicle tank pressurization device, to contain liquid fuel or chemical reducing agents such as AUS32 (aqueous urea solution 32.5%), required for the operation of selective catalytic reduction devices in Diesel cycle engines.

BACKGROUND

A pressurization device is fitted to vehicle tanks in order to maintain a given level of pressure inside the tank itself. Such a device is usually characterised by having a unidirectional valve which is normally closed and is configured to open when the pressure inside the tank reaches a specified threshold. When the valve opens, it allows the outflow of a certain volume of air and/or fuel vapours to the atmosphere, optionally passing through a canister to recover the vapours.

The valve has a valve seat and a shutter which can move towards and away from the valve seat and, in some solutions, has a weight whose magnitude determines the operation of closure and, therefore, the aforesaid pressure threshold. It may also be provided with a set point spring with a relatively low preload, in order to keep the shutter closed against the valve seat despite the vehicle's jolts and vibrations in normal driving condition, and/or in order to increase the value of the threshold pressure required to move the shutter.

In known solutions, the shutter has difficulty in fully lifting from the valve seat and in quickly bringing the internal conditions of the tank below the established threshold pressure, especially when the pressure in the tank slightly exceeds this threshold.

SUMMARY OF THE INVENTION

The purpose of the present invention is to provide a vehicle tank pressurization device, designed to provide a straightforward, low-cost solution to the abovementioned problem.

The present invention provides a vehicle tank pressurization device.

BRIEF DESCRIPTION OF THE DRAWINGS

For a better understanding of the present invention a preferred embodiment is now described, purely as a non-limiting example, with reference to the accompanying drawings, wherein.

DETAILED DESCRIPTION

Figure 1:
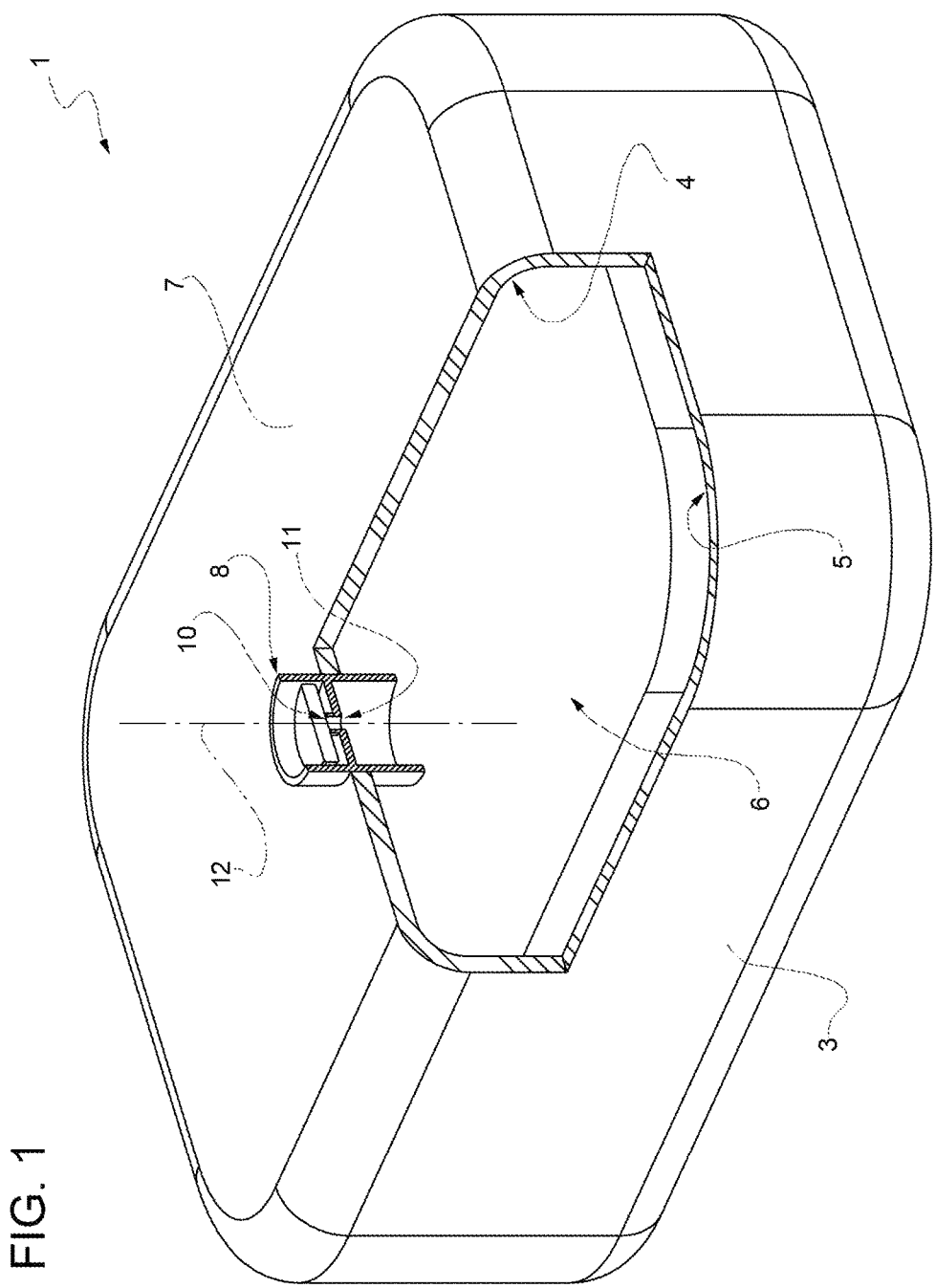
FIG. 1 shows a vehicle tank pressurization device according to the present invention, in simplified perspective view, with parts removed for clarity.

In FIG. 1, the reference number 1 indicates, in its entirety, a vehicle fuel tank (partially illustrated). The tank 1 comprises a shell 3 defining an inner chamber 4 consisting of a lower region 5 occupied by fuel and by an upper region 6 occupied by air and/or fuel vapours.

The shell 3 comprises a wall 7, which defines the top of region 6 and supports a pressurization device 8 comprising a unidirectional valve, which is normally closed and configured so as to open when the pressure in region 6 exceeds a predetermined threshold value.

Figure 2A:
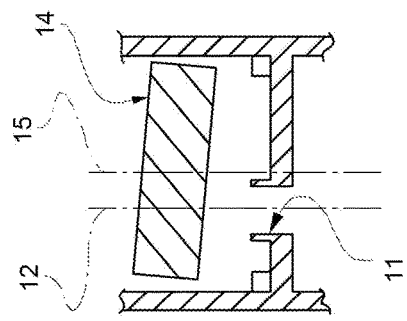
FIG. 2a is a schematic sectional view of the pressurization device of FIG. 1, shown in enlarged scale and in a closed state.

This unidirectional valve comprises a valve seat 10 defining a passage or opening 11 that has a vertical axis 12 and communicates directly and permanently with region 6. With reference to FIG. 2a, the device 8 comprises a chamber 13 formed above the valve seat 10 and communicating directly or indirectly with the atmosphere; and a shutter 14 which is positioned in chamber 13, coaxially with the chamber 13 itself along a vertical axis 15.

Shutter 14 is defined, in the specific example shown, by a plate of substantially cylindrical shape, but other shapes and geometries may be provided as appropriate.

Figure 2B:
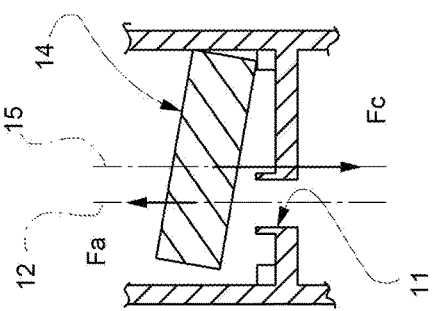
FIGS. 2b and 2c are similar to FIG. 2a and show the pressurization device in two different opening states, depending on the pressure level present in the tank.

Shutter 14 moves within chamber 13 towards and away from valve seat 10 to open/close opening 11 in response to the pressure present in region 6. Shutter 14 has a lower surface 16 facing valve seat 10 and comprising a middle area 17 which blocks opening 11 when the shutter 14 is completely lowered against the valve seat 10. At the same time, the pressure in region 6 acts on area 17 and tends to raise shutter 14 to open opening 11, thus putting the inside of the tank in communication with the outside atmosphere: as can be seen in FIG. 2b, axis 12 determines the direction along which the pressure applies its own opening force (Fa) upwards on area 17. On the other hand, the weight of shutter 14 determines the downwards closing force (Fc) to balance this opening force and tends to keep opening 11 closed. The weight of shutter 14 is set by design in a relatively precise manner so as to define the abovementioned threshold value, beyond which shutter 14 is lifted by the pressure acting on area 17, in such a way as to discharge air and/or fuel vapours through opening 11 and so to restore the pressure in tank 1 below the abovementioned threshold value.

In the case shown, there is no coupling system or any constraint that limits or imposes a given movement to shutter 14. Alternatively, the only constraint is given by a set point spring not shown that exerts a relatively small additional closing force in accordance with the weight of shutter 14, to prevent shutter 14 from lifting in an undesirable manner due to vibrations or jolting during normal operation of the vehicle. In this case, the threshold value to produce venting through opening 11 is determined on the basis of the combination of the weight of shutter 14 and the thrust of the set point spring.

Under the present invention, the center of gravity of shutter 14 is offset or eccentric with respect to axis 12. In this way, shutter 14 may be more easily moved by the pressure present in region 6 and, furthermore, a greater fluid flow vented through opening 11 is produced, at an equal pressure to that inside tank 1, especially when such pressure is only slightly greater than the predetermined set threshold value.

Figure 2C:
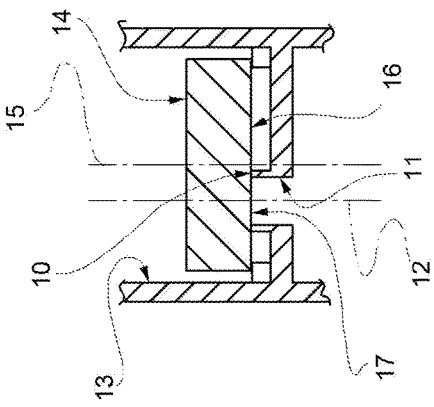

In the embodiment of FIGS. 2a, 2b and 2c, the center of gravity of shutter 14 lies on axis 15, while the latter is offset from axis 12. In other words, axis 12 is offset laterally with respect to the center of chamber 13 and shutter 14.

FIG. 2b shows the behaviour of shutter 14 when the pressure in region 6 slightly exceeds the threshold value. It can be seen that the offset of the center of gravity of shutter 14 from axis 12 leads to a couple or tilting moment on shutter 14 and then to a tilting of shutter 14 itself into chamber 13.

This tilting, in turn, leads to a larger space or section area for the outflow of air and/or of fuel vapours from opening 11 to chamber 13, on one side of valve seat 10, with respect to the operating conditions of the prior art where the center of gravity of shutter 14 lies on axis 12 which therefore travels parallel to itself along axis 12 during the opening. In the opening operating condition under the present invention, the venting starts more readily and is completed more quickly than in the operating condition of the prior art, described above.

FIG. 2c shows the behaviour of shutter 14 when the pressure in region 6 of tank 1 exceeds the threshold value to a large extent: in this case, the discharge conditions are similar to those that occur in the operating conditions of the prior art.

FIGS. 3a, 3b and 3c and FIGS. 4a, 4b and 4c show two variants, in which the same reference numbers as in FIGS. 2a, 2b and 2c have, where possible, been used. In these variants, shutter 14 is replaced, respectively, by shutter 14a and by shutter 14b, which have shapes that are asymmetrical with respect to axis 15, so as to have the center of gravity displaced horizontally at one side with respect to axes 15 and 12, while preferably being made from materials having homogeneous density. In other words, each of the shutters 14a and 14b consists of two portions, which are diametrically opposite and have different shapes.

In particular, shutter 14a consists of two portions 19 and 20, of which one has an average axial height smaller than the other. In the case of shutter 14b, the latter has, instead, a cavity 21 set at an eccentric position with respect to axis 15, so as to displace the center of gravity on the diametrically opposite side.

Figure 3A:
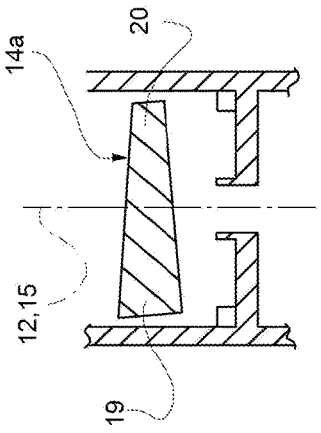
FIGS. 3a, 3b and 3c are similar to FIGS. 2a, 2b and 2c respectively and show a first variant of the device of FIG. 1.
Figure 3B:
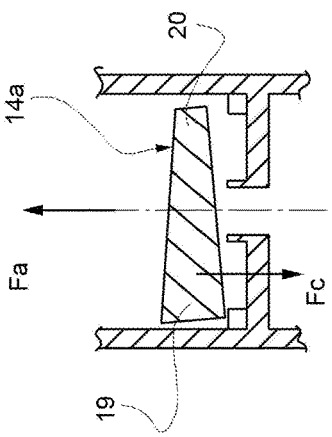
Figure 3C:
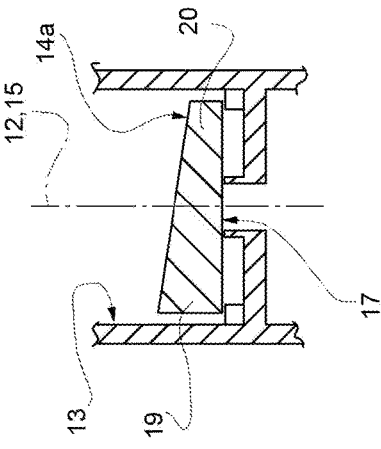
Figure 4C:
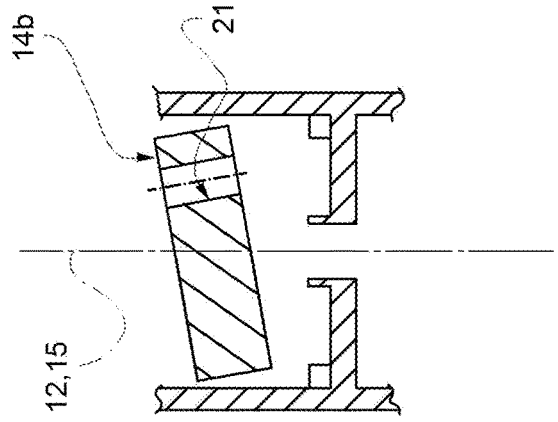
FIGS. 4a, 4b and 4c are similar to FIGS. 2a, 2b and 2c respectively and show a second variant of the device of FIG. 1.
Figure 4B:
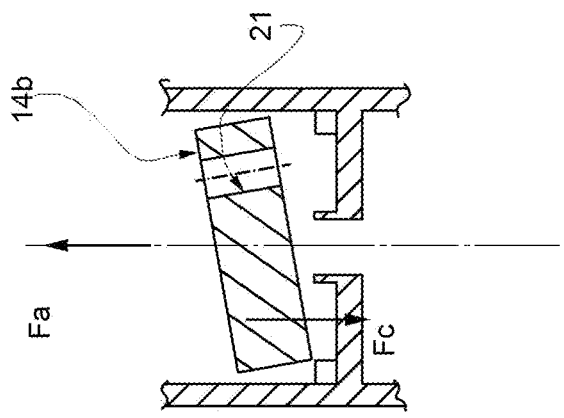
Figure 4A:
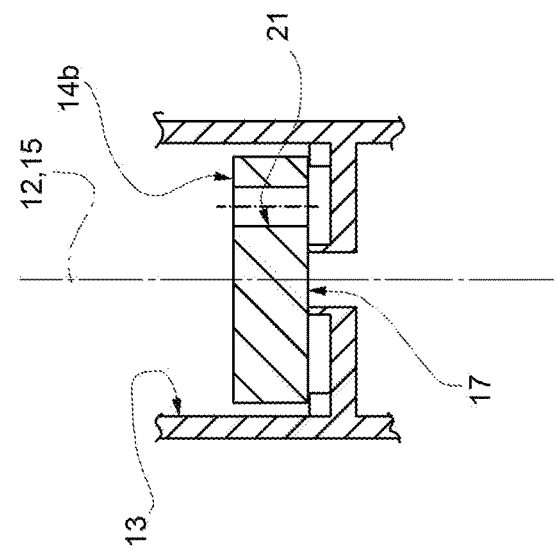

FIGS. 3b and 4b are similar to FIG. 2b and show the effectiveness of the behaviour of shutters 14b and 14c respectively, when the pressure in region 6 slightly exceeds the threshold value.

Under a variation not shown, a shutter is provided that has a symmetrical shape with respect to axis 15, as in the case of FIG. 2a, but consisting of one or more materials in such a way as to have non-homogeneous density in order to make its center of gravity eccentric.

From the above description it is evident how, with a center of gravity which is eccentric with respect to axis 12, the opening force exerted by the pressure causes the shutter not only to translate axially but also to rotate, whereby a readier opening and a greater outflow of air and/or fuel vapours is achieved.

The method by which to obtain the eccentricity of the center of gravity may be different, as apparent from the abovementioned examples, and can be chosen on the basis of needs and benefits (dimensions, production techniques, etc.) depending on the specific practical case.

Finally, it is clear that the device 8 described and illustrated herein with reference to the appended schematic figures can be subject to modifications and variations without thereby departing from the protective scope of the present invention as defined in the appended claims.

In particular, the shapes of the various components may be different and/or be defined by a combination of examples that have been indicated above by way of example.

Furthermore, tank 1 could be provided on the vehicle to contain chemical reducing agents needed for operating devices for selective catalytic reduction in Diesel cycle engines.

What is claimed is:

1. A vehicle tank pressurization device, comprising:
a tank comprising an internal upper region;
a valve seat defining an opening for fuel vapours and/or air; said opening having a vertical axis coincident with the direction of application of an opening force; the opening force being directed upwards and being defined by pressure of said fuel vapours and/or said air in the internal upper region of the tank;
a shutter positioned above said valve seat and within a chamber, the shutter being movable within the chamber towards and away from said valve seat to open/close said opening and having a weight set by design in such a way as to define the magnitude of a closing force directed downwards;
wherein the shutter is not coupled to the valve seat and is free to move away from the valve seat when subject to a sufficient value of the pressure;
wherein the shutter comprises a shutter cavity formed in an eccentric position with respect to the vertical axis, in such a manner that said shutter has a shutter center of gravity positioned eccentrically with respect to said vertical axis;
wherein the shutter is positioned coaxially with respect to the opening along the vertical axis; and
wherein the vertical axis is horizontally positioned between the shutter cavity and the shutter center of gravity.

2. The pressurization device of claim 1, wherein the shutter is made from one or more materials having homogenous density.

3. The pressurization device of claim 1, wherein the shutter cavity and the shutter center of gravity are arranged in diametrically opposite positions with respect to said vertical axis.

4. The pressurization device of claim 1, wherein the shutter and the opening are positioned coaxially with respect to the chamber along the vertical axis.

5. The pressurization device of claim 1, wherein the shutter comprises:
a lower surface proximate the valve seat and
an upper surface distal from the valve seat,
wherein the shutter cavity extends from said lower surface to the upper surface.

* * * * *